US011575670B2

(12) United States Patent
McDougall et al.

(10) Patent No.: US 11,575,670 B2
(45) Date of Patent: Feb. 7, 2023

(54) ADAPTIVE USER AUTHENTICATION (71) Applicant: ACCENTURE GLOBAL SOLUTIONS LIMITED, Dublin (IE)

(72) Inventors: Anthony Peter McDougall, Bywong (AU); Michael John Simmons, Weetangera (AU); Gerard Johan Landman, Jerrabomberra (AU)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 149 days.

(21) Appl. No.: 17/105,281

(22) Filed: Nov. 25, 2020

(65) Prior Publication Data
US 2021/0176242 A1 Jun. 10, 2021

Related U.S. Application Data (60) Provisional application No. 62/945,712, filed on Dec. 9, 2019.

(51) Int. Cl.
H04L 29/06 (2006.01)
H04L 9/40 (2022.01)

(52) U.S. Cl.
CPC ........ H04L 63/0861 (2013.01); H04L 63/083 (2013.01)

(58) Field of Classification Search
CPC ... H04L 63/0861; H04L 63/083; G06F 21/32; G06F 21/31
See application file for complete search history.

(56) References Cited

U.S. PATENT DOCUMENTS

| 9,639,689 | B1 | 5/2017 | Herskovic et al. | |
|---|---|---|---|---|
| 10,154,029 | B1* | 12/2018 | Griffin | H04L 9/0861 |
| 2004/0058710 | A1* | 3/2004 | Timmins | H04M 3/4931 |
| | | | | 455/560 |
| 2006/0069918 | A1* | 3/2006 | Takahashi | H04N 1/4413 |
| | | | | 713/176 |
| 2008/0307220 | A1* | 12/2008 | Campbell | G06Q 20/02 |
| | | | | 713/155 |
| 2009/0025071 | A1* | 1/2009 | Mumm | H04L 63/0861 |
| | | | | 704/E15.001 |
| 2011/0225625 | A1 | 9/2011 | Wolfson et al. | |
| 2014/0289820 | A1 | 9/2014 | Lindemann et al. | |
| 2015/0187359 | A1 | 7/2015 | Bhaskaran | |
| 2018/0218139 | A1 | 8/2018 | Tussy | |
| 2018/0337917 | A1* | 11/2018 | Wallace | G06V 40/70 |
| 2019/0166110 | A1 | 5/2019 | Miu | |
| 2020/0026939 | A1* | 1/2020 | Sim | G06V 40/70 |
| 2022/0046128 | A1* | 2/2022 | Cinelli | H04L 51/10 |

* cited by examiner

Primary Examiner — Piotr Poltorak
(74) Attorney, Agent, or Firm — Mannava & Kang, P.C.

(57) ABSTRACT

An adaptive user authentication system is disclosed that executes user authentication by verifying user identity using different authentication steps based on a risk score. The risk score enables determining if the requesting user's identity is to be verified. If it is determined that the user identity is to be verified, a sequence of authentication steps is implemented wherein more and more data is collected regarding the user as the user fails to be authenticated at each of the authentication steps. A first authentication step includes a numerical-based authentication step followed by a second authentication step including a live image authentication. If the user fails to be authenticated at either the first or the second authentication steps then a third authentication step to verify the user's passport is implemented.

20 Claims, 8 Drawing Sheets

ADAPTIVE USER AUTHENTICATION

PRIORITY

This application is a non-provisional application of the U.S. provisional patent application bearing Ser. No. 62/945,712, entitled "Digital Content Security And Communication System Using Anonymized Account Classification And Analysis", filed on Dec. 9, 2019, the entirety of which is incorporated herein by reference.

BACKGROUND

Cyberattacks and data fraud are becoming serious threats to individuals, organizations, and society at large. The number of attacks is also increasing at a rapid rate. Several conventional approaches have been used to combat data security problems. Disk encryption in hardware and software, such as on-the-fly encryption (OTFE) or transparent encryption, involves converting data to an unreadable or otherwise inaccessible format. Data masking or data obfuscation is used to "hide" data. Masking is achieved by inserting random characters in data fields to mislead and prevent sensitive data from being accessed by unauthorized personnel. Backups are used for the recovery of data to help restore data in the event of data corruption or erasure. These and other conventional techniques are used to help minimize the impact of cyberattacks and data breaches.

Organizational entities that rely on communication of data, especially in global digital transactions for goods or services, typically use some form of the online portal in which a user may be required to submit an application containing information about his or her identity. Such technologies involve situations where the user inquiries about or desires access to various commercial, financial, or government products or services. Although these organizational entities are spending large amounts of money and resources to create and deploy online applications for more secured transactions, there are still several technical problems that continue to persist in when fraud prevention is to be balanced with customer experience.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An adaptive user authentication system for user identity verification based on a risk score is disclosed. The adaptive user authentication system verifies user identity via a sequence of information collection steps wherein each information collection step or authentication step requests at least one of the plurality of user data pieces. Each data piece includes more detailed user identification information than the user data piece requested in a previous step in the sequence thereby enabling identification of a user. In an example, the user authentication system can be coupled to different databases to enable verification of the information provided by the user. When a user request to access services of a transaction processing system is received, a risk score based on various factors associated with the user request is initially generated. A user authentication signal is generated if it is determined based on the risk score that the user identity needs to be verified. In an example, other user metadata associated with the user request can be transmitted to the adaptive user authentication system which implements the various authentication steps to verify the user's identity.

In an example, the different thresholds for determining if user identity verification is required may be determined empirically based on historical data. If the risk score is less than a predetermined threshold, it is determined that the user request is authentic and the user may be permitted access to services of the transaction processing system. If the risk score is greater than the predetermined threshold an adaptive user authentication process is implemented wherein a sequence of authentication steps are executed. A first authentication step can involve a numerical verification based authentication. If the user does not clear the first authentication step, a second authentication step is triggered. A live image of the user is requested during the second authentication step wherein the live image preferably includes a video image of the user captured at the time of execution of the second authentication step. Upon receiving the image, it is determined if the image is indeed a live image and if the image includes the user associated with the login credentials supplied to the transaction processing system for access to the services. Based on these two determinations, the user may be denied access or authenticated to access the services of the transaction processing system.

If the user identity cannot be determined at the second authentication step, a third authentication step is also implemented to verify the user's identity. The user's passport data is verified in the third authentication step. The passport data can include the various fields in the passport along with the passport pages, visa stamps and if possible, the passport chip data. Depending on the number of steps that are implemented, the information regarding the user clearing or failing one or more of the authentication steps is transmitted to the transaction processing system to allow or disallow the user from accessing the services. In an example, the user may be invited to a designated physical location to present the identification documents to access the services if the user fails to clear one or more of the authentication steps.

The adaptive user identity system disclosed herein provides a technical improvement over systems relying on static identity data alone which remains largely ineffective since digital content may be easily stolen, spoofed, or misused by fraudsters. Furthermore, customer behavior is complex, not always direct or predictable. For example, a single user can log in from multiple devices, locations, and channels. Also, creating a user account before a customer can peruse or search various goods or services may hinder that customer from continuing. These and other behaviors can add extra layers of complexity to user authentication or identification that dampen any online application experience. As a result, a risk-based approach using digital identity intelligence as implemented by the disclosed adaptive user authentication system enables organizational entities to verify low-risk users with minimum friction to enhance digital content security and communication thereby providing users a more pleasant online experience and yet still pick out bad actors. As used herein, "friction" may be defined as a level of effort applied to a user to complete a task. As described herein, to complete an online application, for example, customer behavior typically indicates that it is cumbersome to gather personal details. Such processes often hinder customers from interacting and reduce user experience in the online application process. Furthermore, a more robust and holistic approach for digital content security and communication using account classification and analysis may be provided to overcome the shortcoming of conventional systems and methods.

It should be appreciated that at any point, the identity verification process may be paused and/or resumed to allow for intelligence or other processes to start/complete. The systems and methods described herein may also support the ability to schedule human intervention to ask questions and to gather intelligence from a potentially nefarious applicant. Each submission of a fragment of information may be used to further build the online application rather than waiting for a submission at the end. For example, each process fragment or authentication step may be configured so that it may not be undone. That said, a user or applicant may provide a different answer that may or may not overwrite a previous history. It should also be appreciated that the user, at each point along the verification process, maybe consenting to the use of the information and at any time can choose to quit the verification process; however, the last submission of information will be retained depending on how the system is configured. The adaptive user authentication system described herein may therefore allow an organization entity (e.g., commercial, financial, government, etc.) to engage with users in various ways based on a risk score or parameter associated with the user. The adaptive user authentication system may also provide customized user interfaces to make user interactions with the transaction processing system more expedient, less error-prone, and more intelligent. Moreover, the adaptive user authentication allows banks and government agencies, such as postal services, to increase system security against fraudulent activity. The adaptive user authentication disclosed herein improves existing systems by preventing losses due to fraud and helps organizations comply with regulations regarding security, know your customer (KYC) and anti-money laundering (AML).

Figure 1:
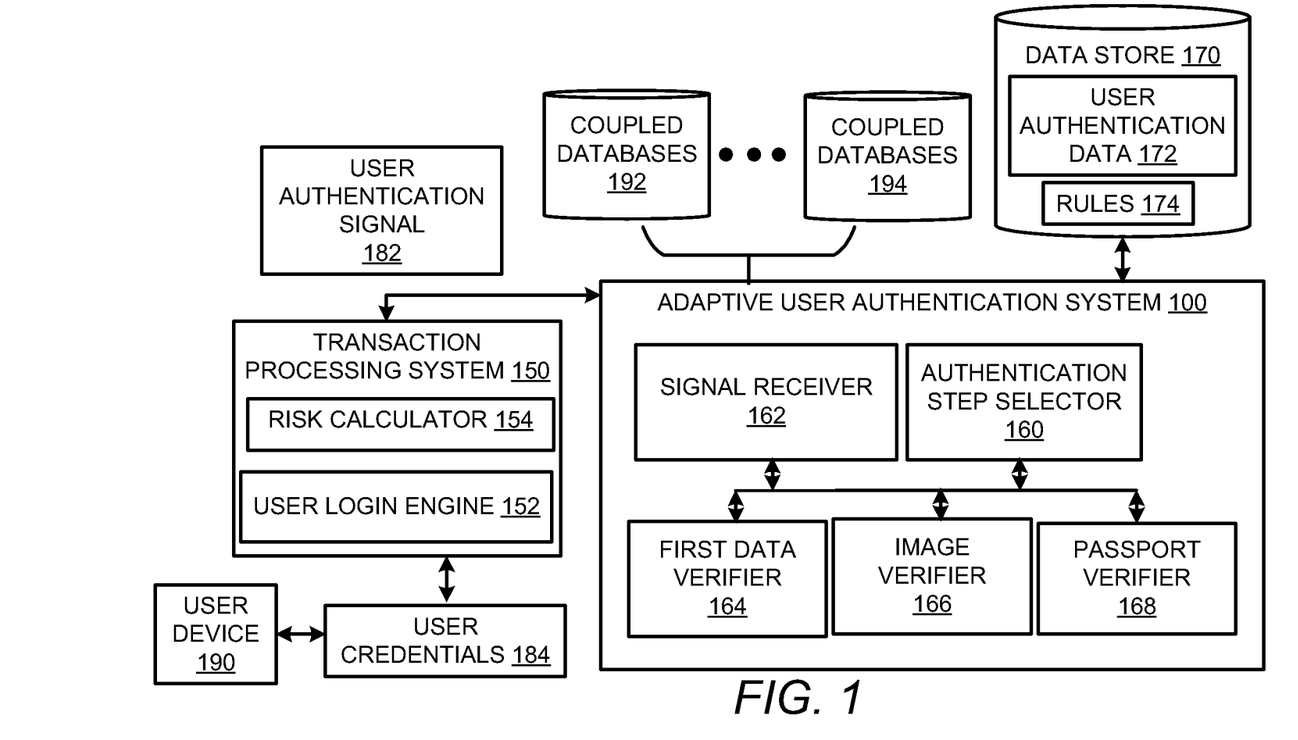
FIG. 1 shows a block diagram of an adaptive user authentication system in accordance with the examples disclosed herein.

FIG. 1 shows a block diagram of an adaptive user authentication system 100 in accordance with the examples disclosed herein. The adaptive user authentication system 100 serves to authenticate users to a transaction processing system 150. The transaction processing system 150 can include any system that allows user transactions such as but not limited to, a financial system such as a banking system, an eCommerce system, etc., a healthcare system (e.g., where users can log in to conduct transactions related to healthcare such as transactions related to hospitals, labs, insurance claims, etc.), and/or a content provider system (e.g., where users can conduct transactions to access entertainment content such as movies, games, books, music, etc., or educational content, such as training material, tests, etc.)

Among various other components and services that enable user transactions, the transaction processing system 150 includes a user login facilitator 152 and a risk calculator 154. When a user attempts to access services of the transaction processing system 150 by providing user credentials 184 such as a username and a password to the transaction processing system 150, the user login engine 152 receives the user credentials 184 and triggers the risk calculator 154 to assess the risk by calculating a risk score for the user's request. The risk calculator 154 can calculate a risk score based on different factors such as but not limited to, whether the user device 190 used to transmit the request is pre-authenticated by the transaction processing system 150, the number of user login attempts, the last time the user logged in, the different number and types of device(s) employed by the user for logging in, the location information associated with the user login request (if available), or other historical data associated with the user's profile, etc. In an example, the different factors associated with unusual patterns in user login activity can increase the risk score. The risk score can be calculated as an aggregate, a mean, or a weighted combination of the various factors outlined herein.

The risk calculator 154 can be further configured to compare the risk score with a predetermined risk threshold. Various risk levels can be defined based on a comparison of the risk score with the predetermined risk threshold as detailed herein. Based on the predetermined risk threshold, it can be determined if the user's request for services is a low-risk request that can be approved or if further verification of the user identity is required because the user request is a higher risk request. If it is determined that further verification is needed, a user authentication signal 182 is generated and transmitted to the adaptive user authentication system 100 to trigger an adaptive authentication process for authenticating the user. In an example, the user authentication signal 182 can also include the metadata of the user request, e.g., location of the user device, the time of receipt of the initial user access request, etc. Although the description herein may illustrate the adaptive user authentication system 100 establishing a communication path with the user device 190 for direct exchange of messages, it may be appreciated that this is not necessary. In an example, messages to and from the adaptive user authentication system 100 with the user device 190 may be routed through the transaction processing system 150 for user data privacy and security purposes.

Although the adaptive user authentication system 100 is shown as being separate from the transaction processing system 150 it can be appreciated that this is not necessary and that the adaptive user authentication system 100 can be integrated with the transaction processing system 150. The adaptive user authentication system 100 can include an authentication step selector 160, a signal receiver 162, a first data verifier 164, an image verifier 166, and a passport verifier 168 wherein each of the verifiers corresponds to an authentication step that is to be applied to the user request. The adaptive user authentication system 100 can further include a local data store 170 that stores user authentication data 172 received or employed in the various steps of the user authentication process in addition to rules 174 that administer the various processes. The signal receiver 162 receives and decodes the user authentication signal 182 to initiate a first one of a sequence of authentication steps to be applied to the user's request. For example, the adaptive user authentication system 100 can seamlessly interact with the transaction processing system 150 so that the user interface (UI) put forth by the adaptive user authentication system 100 maintains the look and feel of the UI of the transaction processing system 150 thereby making the redirection opaque to the user. The seamless redirection not only maintains the confidence of a genuine user but also serves in preventing a fraudulent user from being alerted regarding the additional authentication steps being required. The sequence of authentication steps is designed to engage the user while progressively collecting more and more information from the user. Therefore, if the user attempting the login is a fraudulent user, the adaptive user authentication system 100 enables maintaining contact with a fraudulent user for a longer time while also collecting a greater amount of data from the fraudulent user that may enable identifying and prosecuting the fraudulent user. When the authentication process is completed, the user device 190 can be redirected back to the transaction processing system 150 to conduct transactions if the user is authenticated. If, however, the user cannot be authenticated, a message can be transmitted to the user that in-person authentication is required and requesting the user to contact the administration of the transaction processing system 150 for further details. In an example, the adaptive user authentication system 100 can be configured to generate a token or an authenticated user identifier to be provided to the transaction processing system 150 upon successful authentication of the user.

The adaptive user authentication system 100 can be further communicatively coupled to external or third-party databases 192, . . . , 194, for verification of information provided by the user during the execution of the authentication steps. The external databases can include those databases coupled to the transaction processing system 150 while the third-party databases include those databases made available by external providers for information verification. In an example, third-party databases can include subscription-based databases, government databases, etc. The authentication process implemented by the adaptive user authentication system 100 includes authentication steps that progressively request more detailed information from the user to determine if the user is a genuine or authentic user or a fraudulent user. Accordingly, a preliminary authentication step that can be implemented for user requests includes a numeral-based verification implemented by the first data verifier 164. In response to receiving the user authentication signal, the first data verifier 164 initially transmits a request to the user to provide the first piece of data e.g., a telephone number or some personal identification number (PIN), etc. Upon receiving the first piece of data from the user, the first data verifier 164 determines the authenticity/accuracy of the first piece of data received in the user's response in conjunction with one of the coupled databases 192, . . . , 194. An output including the result of the verification is returned by the first data verifier 164. If the first piece of data from the user's response does not match a stored value of the adaptive user authentication system 100 then the output produced by the first data verifier 164 indicates that the user failed to clear the first authentication step. Based on the output returned by the first data verifier 164 the authentication step selector 160 can determine if further verification of the user is needed. If further verification steps are required, the output from the first data verifier 164 can be cached at the adaptive user authentication system 100 and the next authentication step is initiated wherein the image verifier 166 is activated.

The image verifier 166 receives a live image of the user and determines the authenticity of the user based on the live image. The live image of the user can include a still image or a video image of the user that is captured at the time of the authentication process. Again, a request to capture a live image is transmitted to the user and the received image is analyzed by the image verifier 166 to determine if the user is authenticated or if further verification of the user's identity is required. In accordance with rules 174, the image verifier 166 may store the received live image or transmit the live image to the transaction processing system 150.

Depending on the successful authentication of the user at the second authentication step, the adaptive user authentication system 100 can be configured to implement yet another authentication step via the passport verifier 168. When a third authentication step needs to be implemented, the passport verifier 168 can be activated to transmit a request to the user to provide the user's passport information. The received passport information is compared with the corresponding information retrieved from the coupled databases 192, . . . , 194, for authenticity determination. Based on the outputs from one or more of the first data verifier 164, the image verifier 166, and the passport verifier 168, the transaction processing system 150 may allow or disallow the user from accessing services. The adaptive user authentication system 100 therefore, implements an adaptive "truth diode" that can be used to collect the required level of biometric evidence. When a fraudulent user attempts to access the transaction processing system 150, the adaptive user authentication system 100 is configured to capture the fraudulent user in the act of committing the fraud. Also, the sequencing of information collection is such that there will be low dropout rates in the early steps with exception flows enabled.

Figure 2:
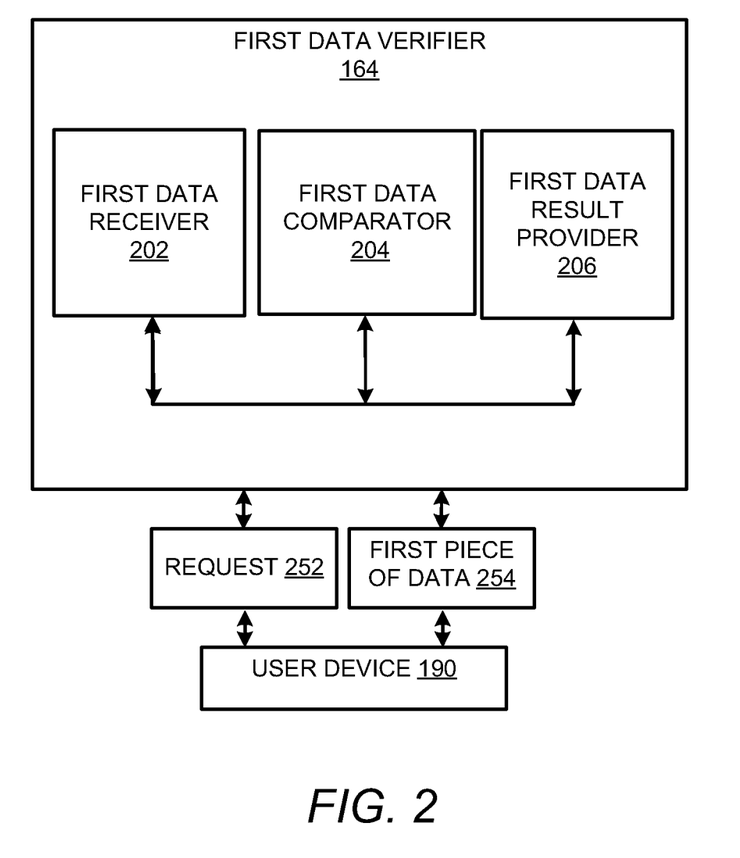
FIG. 2 shows a block diagram of a first data verifier in accordance with the examples disclosed herein.

FIG. 2 shows a block diagram of the first data verifier 164 in accordance with the examples disclosed herein. The first data verifier 164 includes a first data receiver 202, a first data comparator 204 and a first data result provider 206. The first data receiver 202 transmits a request 252 to the user device 190 requesting a first piece of data 254 such as a PIN, a telephone number, an account number, or some unique numerical identification of the user to be authenticated. In response, the user may transmit the first piece of data 254 back to the adaptive user authentication system 100. The first data comparator 204 can communicate with at least one of the coupled databases 192, . . . , 194, to verify the first piece of data 254. For an example, the first data comparator 204 can exchange communications with one or more of the coupled databases 192, . . . , 194, associated with the transaction processing system 150 if the first piece of data 254 includes a system-specific identifier such as a PIN or an account number, etc. In an example, the first data comparator 204 can exchange communications with one or more subscription databases or other third-party databases of the coupled databases 192, . . . , 194, if the first piece of data 254 includes a general identifier such as a phone number, etc. If a matching piece of data is obtained by the first data comparator 204 from the coupled databases 192, . . . , 194, then the first data result provider 206 outputs a result regarding the match. However, if no matching data was retrieved from the coupled databases 192, . . . , 194, then the first data result provider 206 outputs a result regarding the failure to locate the match and hence, the failure to authenticate the user at the first authentication step. In an example, the adaptive user authentication system 100 may be configured to execute automatically subsequent authentication steps, if the user fails to successfully clear a current authentication step. This is because the execution of a greater number of authentication steps enables collecting additional information regarding a possible fraudulent user.

Figure 3:
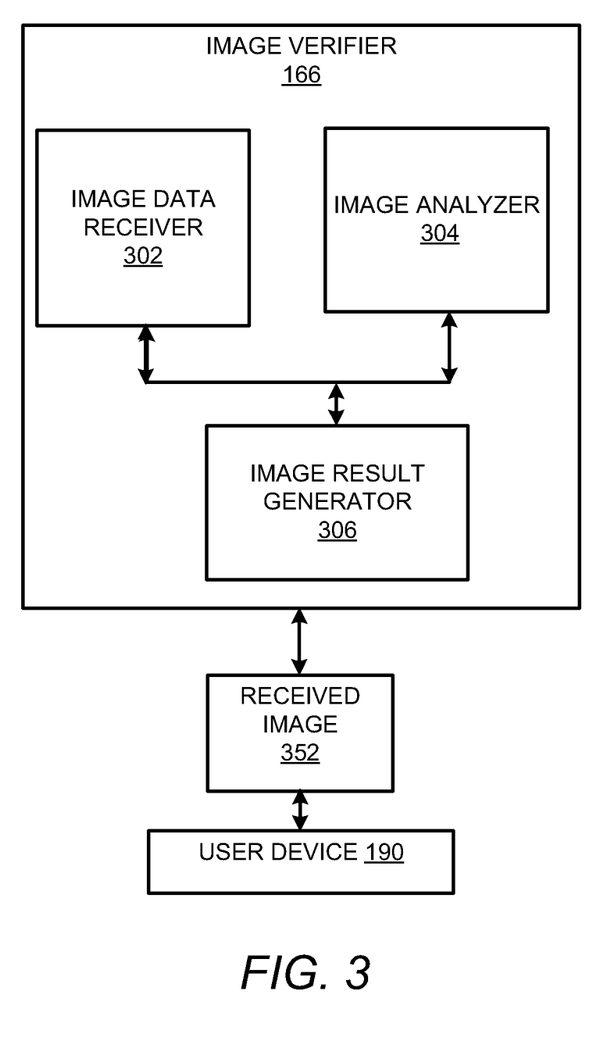
FIG. 3 shows a block diagram of an image verifier, in accordance with the examples disclosed herein.

FIG. 3 shows a block diagram of the image verifier 166, in accordance with the examples disclosed herein. The image verifier 166 is configured to administer a 'liveness test' to determine if the user requesting access to the transaction processing system 150 is a live, human user and not a bot or other code-based entity. The image verifier 166 therefore collects biometric information such as a photograph. The image verifier 166 includes an image data receiver 302, an image analyzer 304, and an image result generator 306. When the first data result provider 206 transmits the result that the user failed to clear the first authentication step, the authentication step selector 160 triggers the image verifier 166 to execute the second authentication step. The image verifier 166 includes the image data receiver 302 which is triggered to transmit a request to the user device 190 to provide a live image of the user. The live image can include a still photograph or a still image or a video of the user to be authenticated that is captured as the second image authentication step or the image authentication step is being executed.

A received image 352 is processed by the image analyzer 304 to determine if the received image was captured at the time of execution of the authentication step or if the image was captured at some prior time point. In an example, if it is determined that the received image 352 was not generated at the time of user authentication, the image data receiver 302 can be configured using the rules 174 to request the user permission to access the camera on the user device 190 and captures an image of the user upon receiving the permission. Upon determining that the received image 352 was indeed captured or generated during the execution of the image authentication step, the image analyzer 304 further accesses the coupled databases 192, . . . , 194, to determine if the received image 352 is an image of an authentic user associated with the user credentials 184 who can access the transaction processing system 150. In an example, the image data receiver 302 can be configured to request a live user image a predetermined number of times or even request access to the camera of the user device 190 to capture a live image of the user. The outputs from the determinations made by the image analyzer 304 are provided to the image result generator 306 which provides the outputs regarding user authentication. If it is determined that the received image is not a live image or if a match could not be identified from the coupled databases 192, . . . , 194, then the image result generator 306 produces an output regarding the failure to verify the user's identity. If it is determined that the received image is an image and if a match could be identified from the coupled databases 192, . . . , 194, then the image result generator 306 produces an output regarding the successful clearance of the image authentication step by the user and no further authentication steps are implemented. The outputs from the image result generator 306 can be transmitted to the transaction processing system 150 upon successful user authentication at the second authentication step. If, however, the user fails to be authenticated at the second authentication step, the outputs may be cached until further authentication steps are executed as detailed herein.

Figure 4:
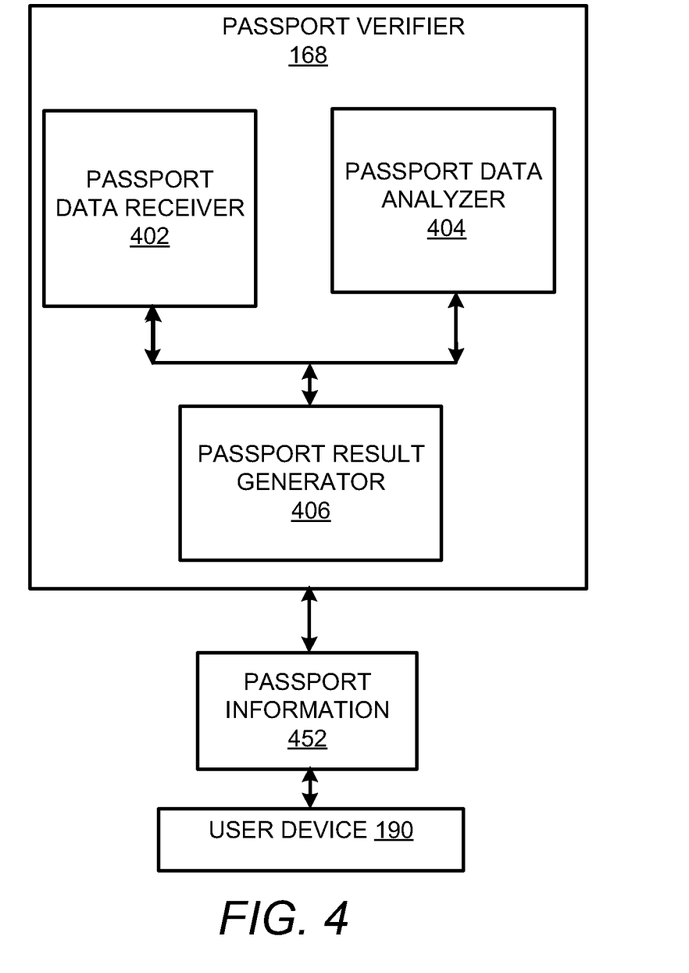
FIG. 4 shows a block diagram of a passport verifier in accordance with examples disclosed herein.

FIG. 4 shows a block diagram of the passport verifier 168 in accordance with examples disclosed herein. Another authentication step is executed to verify the user identity if the user identity verification fails at the image authentication step. The authentication step selector 160 triggers the passport verifier 168 to execute the passport data verification of the user. The passport verifier 168 includes a passport data receiver 402, a passport data analyzer 404, and a passport result generator 406. When triggered, the passport data receiver 402 transmits a message to the user device 190 to provide the user's passport information 452. In an example, the passport data receiver 402 can provide a UI with fields to receive the passport information 452 such as the user's name as included in the passport, the passport number, the date of issue and the date of expiry of the passport, images of the pages of the passport, etc. In some instances, the passport data receiver 402 may also receive the data from the chip in the passport where facilities are equipped with devices for reading the passport chip. The passport data analyzer 404 compares the received passport data with data from one or more of the coupled databases 192, . . . , 194, to determine the authenticity of the passport data. In an example, the coupled databases that are accessed can include government databases or other global databases with detailed descriptions and high-quality images of documents issued by various countries around the globe. In an example, such databases may require subscriptions, and the passport data analyzer 404 can be configured to automatically provide the subscription information e.g., username, password to access the information to access the global databases to verify the passport data. If the passport information 452 is successfully verified, the passport result generator 406 can transmit information regarding the successful authentication of the user to the transaction processing system 150. As the passport verification is the final step in the user authentication process, successful passport verification can further imply that the user's first piece of data (e.g., telephone number or PIN), image, and passport have all been authenticated. In an example, if the information supplied in the previous authentication steps is different from the data in the configured databases 192, . . . , 194, and the user has cleared the passport authentication step, then such information can be provided to the transaction processing system 150 so that the user can be updated if needed. If the passport data verification is unsuccessful i.e., the information provided could not be verified from the coupled databases 192, . . . , 194, a message can be provided to the user device 190 with further options to complete identity verification over the telephone or in-person with the organization associated with the transaction processing system 150, in addition to transmitting a message back to the transaction processing system 150 regarding the failure to authenticate the user.

Figure 5:
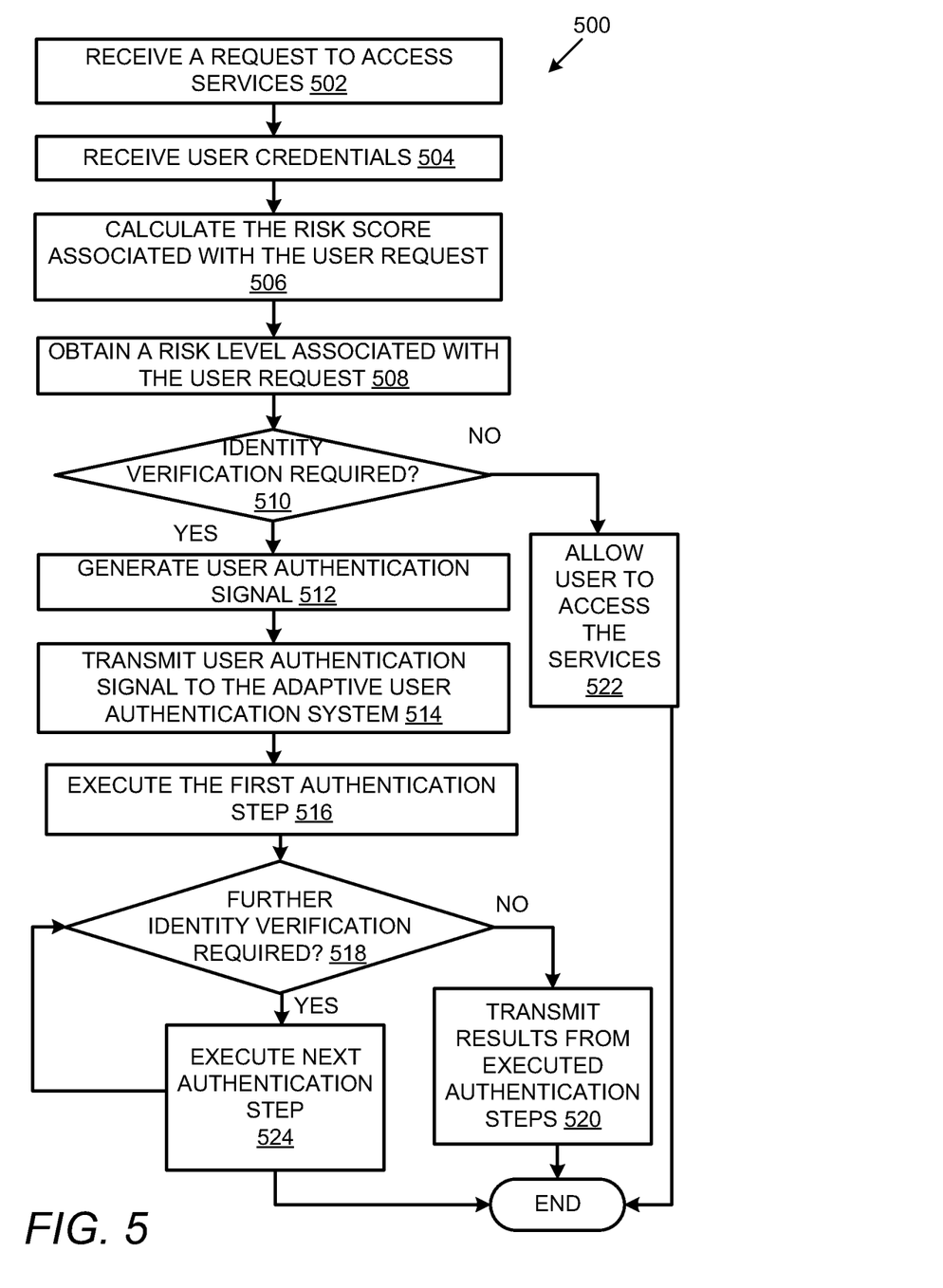
FIG. 5 shows a flowchart that details a method of authenticating a user in accordance with examples disclosed herein.

FIG. 5 shows a flowchart 500 that details a method of authenticating a user via an adaptive user authentication process that implements a series of authentication steps that enable collecting more detailed information with each step in accordance with examples disclosed herein. The method begins at 502 with receiving a request to access services of the transaction processing system 150 user device 190 to transmit the request. At 504, the user credentials such as the username and password, etc., are received. The risk score associated with the user request is calculated at 506. At 508, a risk level associated with the user request is obtained based on the risk score. At 510, it is determined if the risk level justifies an identity verification or if the user can be allowed to directly access the services of the transaction processing system 150 without further verification. As mentioned above, the risk score can be compared to a predetermined risk threshold to trigger the identity verification process. If it is determined at 510 that the user identity needs no verification, the user can be allowed to access the services at 522 without execution of any authentication process.

If it is determined at 510 that the user identity needs to be verified, the user authentication signal 182 is generated at 512 and associated with an input requiring one or more authentication steps to verify user identity. The user authentication signal 182 is transmitted to the adaptive user authentication system 100 at 514. The first authentication step is initially executed at 516 wherein the first piece of data is requested and received from the user device 190. It is further determined at 518 if another authentication step is to be executed. In the first iteration, it is determined at 518 if the second authentication step is to be executed. The determination at 518 regarding the necessity for another authentication step can be made based on the authentication of the user at the prior authentication step. In an example, the adaptive user authentication system 100 can be configured to automatically execute a next authentication step if the user is not authenticated at the prior authentication step. A user authentication fails at the first authentication step if the first piece of data 254 received from the user device 190 is not the same as a stored value in the user authentication data 172. Therefore, if the user authenticity cannot be confirmed at the first authentication step, the adaptive user authentication system 100 may automatically execute a second authentication step at 524 wherein the user's live image is requested and processed to determine the user's authenticity.

If at 518, it is determined that another authentication step is not necessary the results from the executed authentication step(s) are transmitted to the transaction processing system 150 at 520. Upon concluding the second authentication step, the method returns to 518 to determine if there is another authentication step to be executed based on the factors and configuration of the adaptive user authentication system 100 as described above. If at 518, it is determined that no further authentication is needed, then the method concludes at 520 wherein the results from the executed authentication steps are transmitted to the transaction processing system 150. For example, the transmission of the results of successful authentication can include the adaptive user authentication system 100 providing an authenticated user identifier to the transaction processing system 150. If at 518 it is determined that yet another authentication step (i.e., the third authentication step) is to be executed, the method returns to 524 to execute the next authentication step wherein the user's passport data is requested and verified. The method returns to 520 wherein the results from the executed authentication steps, which would now include the results from the first, the second, and third authentication steps are transmitted to the transaction processing system 150.

It can be appreciated that the execution of the authentication steps is described herein as occurring serially for illustration purposes only and that the necessary authentication steps can be executed in parallel also based on the configuration of the adaptive user authentication system 100. For example, if the adaptive user authentication system 100 is not configured to automatically execute the next authentication step upon the failure to authenticate the user at the prior authentication step, the authentication steps may be executed in parallel, and results data may be separately transmitted to the transaction processing system 150 as soon as each authentication step is executed.

Figure 6:
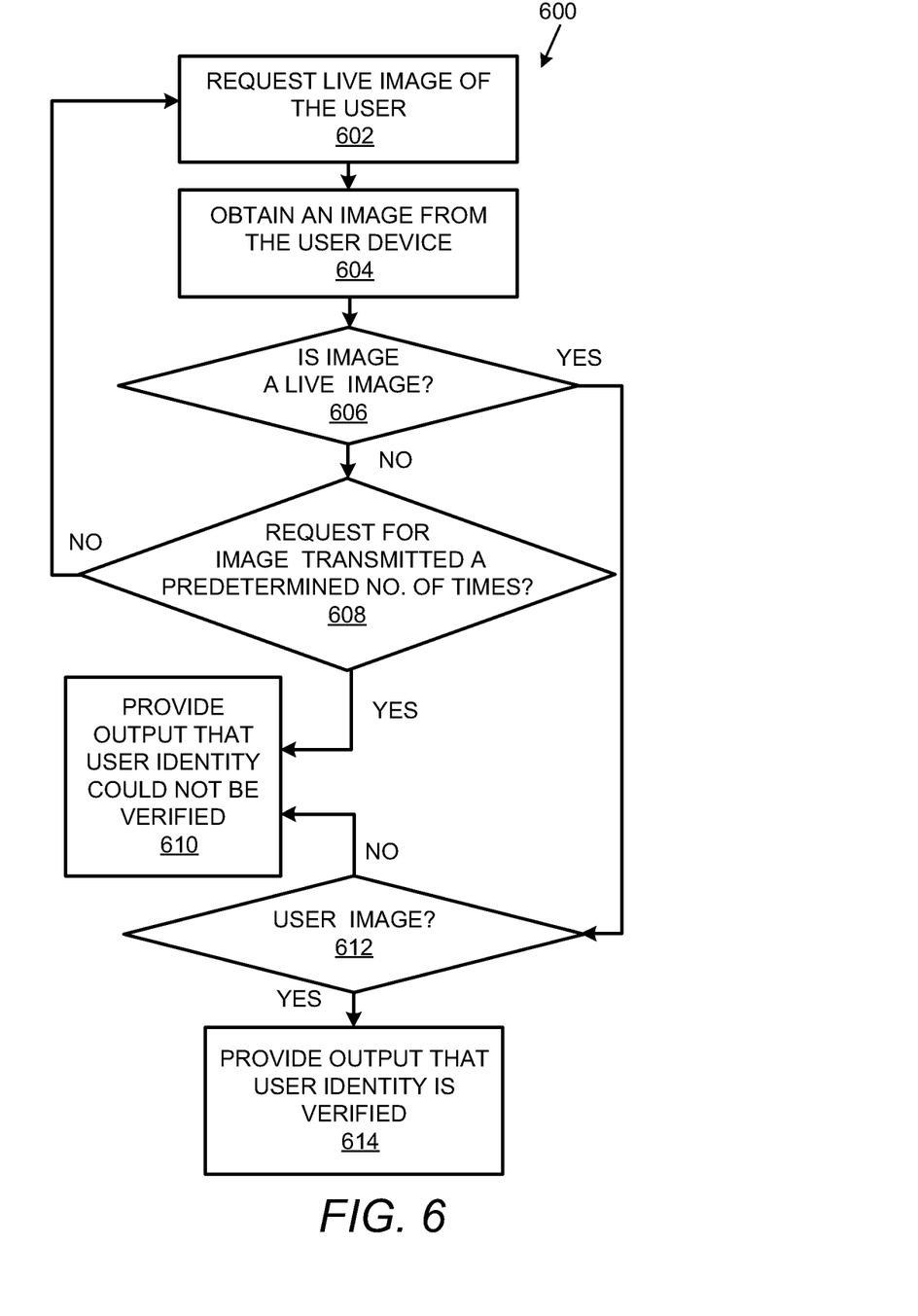
FIG. 6 shows a flowchart that details a method of executing a second authentication step in accordance with the examples disclosed herein.

FIG. 6 shows a flowchart 600 that details a method of executing the second authentication step in accordance with the examples disclosed herein. The method begins at 602 wherein a live image of a user seeking access to the transaction processing system 150 is requested. At 604, an image is obtained from the user device 190. A comparison of the temporal metadata of the image with the current date and time of the user device 190 is performed. Alternatively, the metadata comparison can include a date/time data of a location associated with the user device 190 as retrieved from one of the coupled databases 192, . . . , 194. Based on the metadata comparison, it is determined at 606 if the image received at 604 is a live image based on the comparison. If it is determined at 606 that the image is not a live image, the method moves to 608 to determine if the request for the live image has been transmitted a predetermined number of times. If yes, the method moves to 610 wherein an output is provided that the user identity could not be verified. In an example, if it is determined at 610 that the request for a live image has been transmitted a predetermined number of times, then permission to access a camera of the user device 190 can be requested and upon receiving consent and access to the camera of the user device, the live image can be captured by the image verifier 166 during the execution of the second authentication step.

If it is determined at 608 that the request for a live image has not been transmitted a predetermined number of times, the method returns to 602 to again request the live image. If it is determined at 608 that the images received at 604 is a live image, the method moves to 612 wherein it is determined if the image received at 604 is an image of the user is associated with the login credentials presented with the user request. The determination can be made based on a comparison of the received image 352 with a known image retrieved from one or more of the coupled databases 192, . . . , 194. If it is determined at 612 that the received image is a live image of an authentic user whose login credentials were provided with the user request to the transaction processing system 150, the method moves to 614 wherein an output is generated that the user identity has been successfully verified and the user is authenticated to conduct transactions with the transaction processing system 150. If it cannot be confirmed at 612 that the received live image is that of the user associated with the login credentials provided to the transaction processing system 150, the method moves to 610 wherein an output is generated that the user identity could not be verified.

Figure 7:
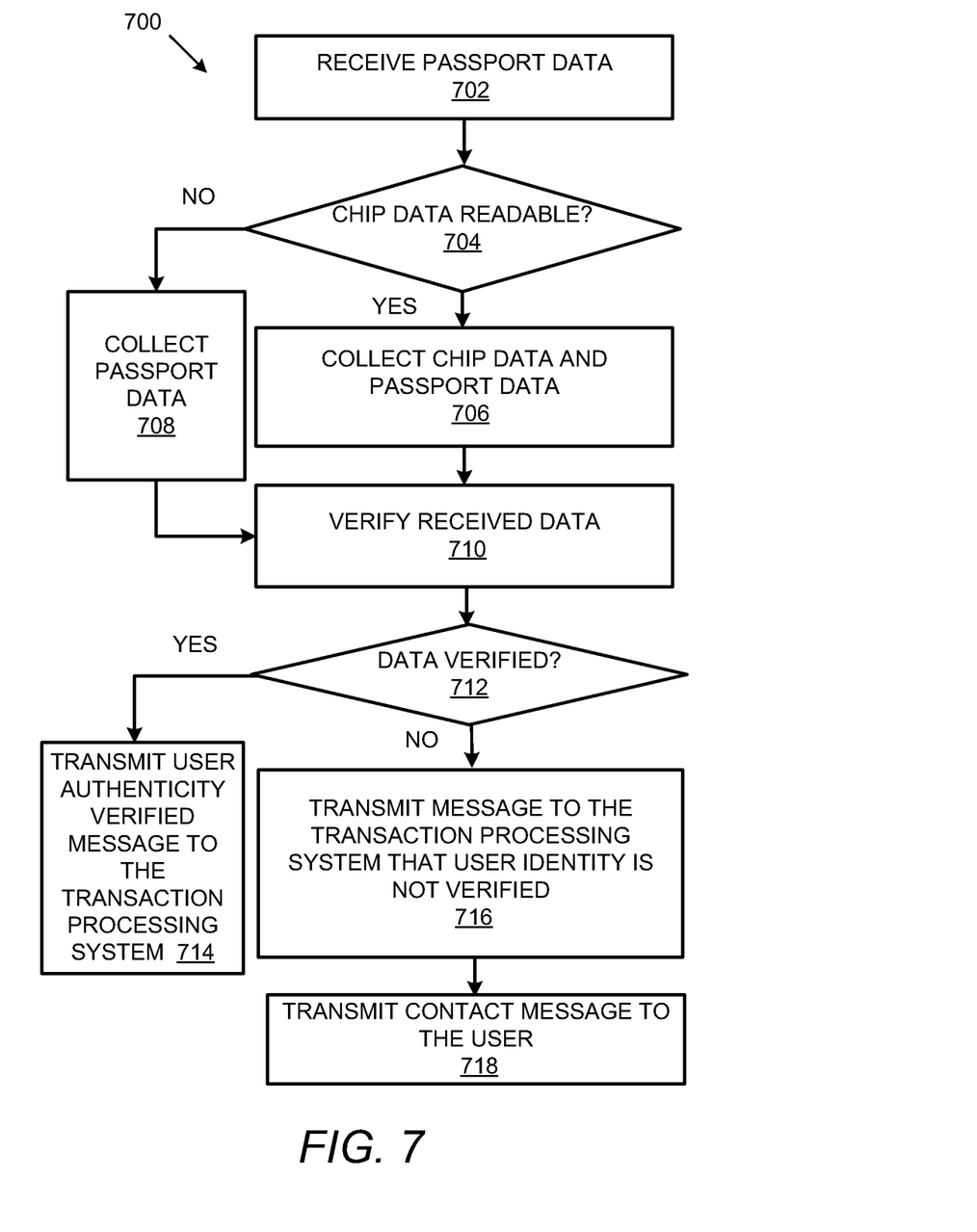
FIG. 7 shows a flowchart that details a method of verifying passport data of a user to be authenticated in accordance with the examples disclosed herein.

FIG. 7 shows a flowchart 700 illustrating a method of verifying passport data of the user to be authenticated in accordance with the examples disclosed herein. In an example, the method shown in flowchart 700 can be implemented by the passport verifier 168. The method begins at 702 with the passport verifier 168 receiving passport data. At 704, it is determined if the chip data of the passport is readable. If yes, the method moves to 706 to collect the passport data and the chip data. If the chip data of the passport cannot be read, the method moves to 708 to obtain only the passport data. The received data is verified at 710 from the coupled databases 192, . . . , 194. If it is determined at 712 that the data was verified at 710, then a message is transmitted to the transaction processing system 150 at 714 that the user's authenticity is verified and the user may proceed with the requested transactions. However, if the data verification fails at 712, then a message is transmitted to the transaction processing system at 716 that the identity verification has failed. Also, a message is transmitted to the user device 190 at 718 that the identity verification process has failed and that the user has to contact the organization responsible for the transaction processing system 150 to conduct any transactions.

Figure 8:
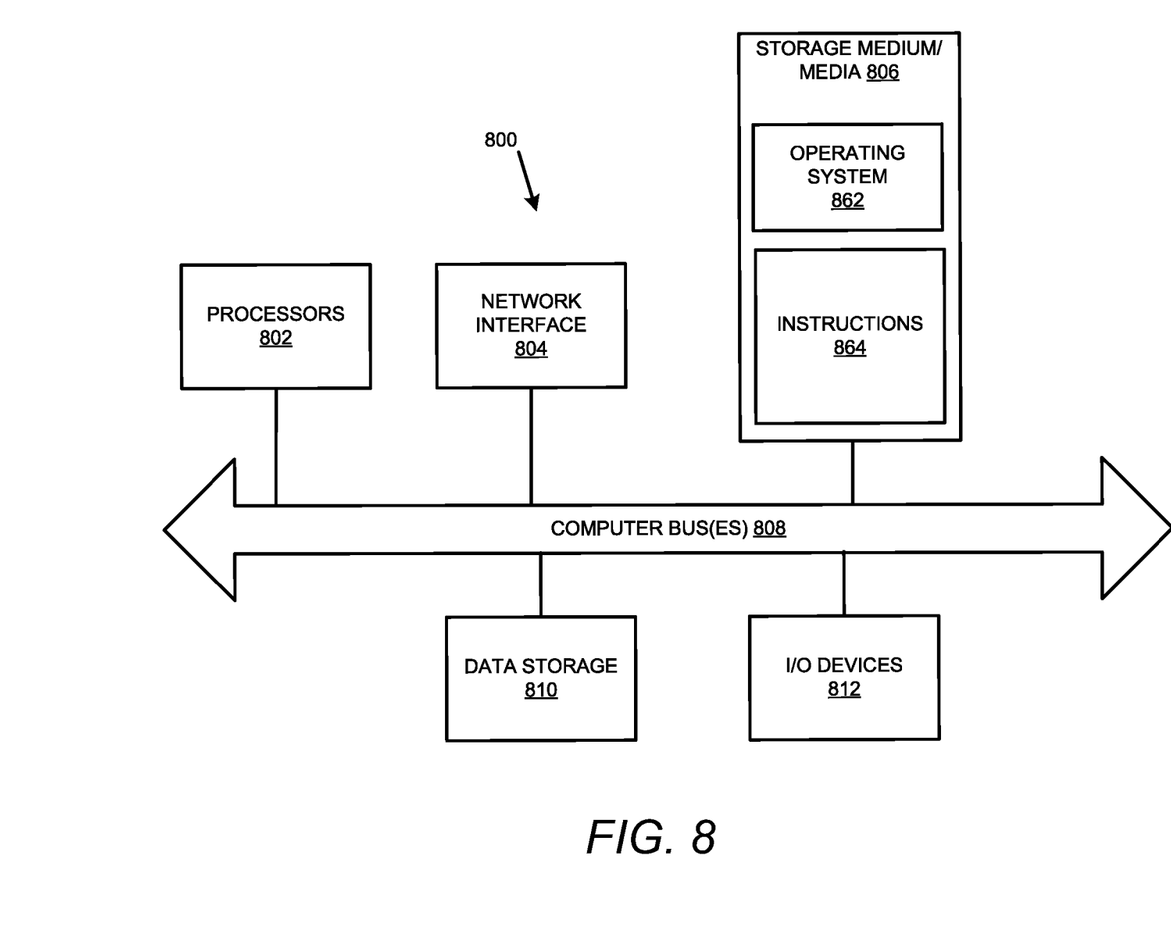
FIG. 8 illustrates a computer system that may be used to implement one or more of the adaptive user authentication system and a transaction processing system in accordance with the examples disclosed herein.

FIG. 8 illustrates a computer system 800 that may be used to implement one or more of the adaptive user authentication system 100 and the transaction processing system 150. More particularly, computing machines such as desktops, laptops, smartphones, tablets, and wearables which may be used to generate or access the data from one or more of the adaptive user authentication system 100 and the transaction processing system 150 may have the structure of the computer system 800. The computer system 800 may include additional components not shown and that some of the process components described may be removed and/or modified. In another example, a computer system 800 can sit on external-cloud platforms such as Amazon Web Services, AZURE® cloud or internal corporate cloud computing clusters, or organizational computing resources, etc.

The computer system 800 includes processor(s) 802, such as a central processing unit, ASIC or another type of processing circuit, input/output devices 812, such as a display, mouse keyboard, etc., a network interface 804, such as a Local Area Network (LAN), a wireless 802.11x LAN, a 3G, 4G or 5G mobile WAN or a WiMax WAN, and a processor-readable medium 806 (also referred to as a storage medium/media). Each of these components may be operatively coupled to a bus 808. The processor-readable medium 806 may be any suitable medium that participates in providing instructions to the processor(s) 802 for execution. For example, the processor-readable medium 806 may be a non-transitory or non-volatile medium, such as a magnetic disk or solid-state non-volatile memory or volatile medium such as RAM. The instructions or modules stored on the processor-readable medium 806 may include machine-readable instructions 864 executed by the processor(s) 802 that cause the processor(s) 802 to perform the methods and functions of one or more of the adaptive user authentication system 100 and the transaction processing system 150.

One or more of the adaptive user authentication system 100 and the transaction processing system 150 may be implemented as software stored on a non-transitory processor-readable medium and executed by the one or more processors 802. For example, the processor-readable medium 806 may store an operating system 862, such as MAC OS, MS WINDOWS, UNIX, or LINUX, and code 864 for one or more of the adaptive user authentication system 100 and the transaction processing system 150. The operating system 862 may be multi-user, multiprocessing, multitasking, multithreading, real-time, and the like. For example, during runtime, the operating system 862 is running and the code for one or more of the adaptive user authentication system 100 and the transaction processing system 150 is executed by the processor(s) 802.

The computer system 800 may include a data storage 810, which may include a non-volatile data storage device. The data storage 810 stores any data used by one or more of the adaptive user authentication system 100 and the transaction processing system 150. The data storage 810 may be used to store the users' login credentials 184, the user authentication data 172, the rules 174, or other data that is used or generated by one or more of the adaptive user authentication system 100 and the transaction processing system 150 during operation.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An adaptive user authentication system, comprising:
one or more data storage devices,
the one or more data storage devices to storing user authentication data, and one or more processors,
the one or more processors executing machine-readable instructions stored in the at least one storage device to:
receive a user authentication signal for initiating an adaptive user authentication process,
the user authentication process enabling a user employing a user device to access a transaction processing system upon authentication;
trigger a first authentication step,
the first authentication step triggered based on the user authentication signal,
the first authentication step being from a sequence of authentication steps to be executed during the adaptive user authentication process;
request a first piece of data from the user as part of the first authentication step;
verify the first piece of data received from the user;
determine that at least a second authentication step from the sequence of authentication steps is to be executed for authenticating the user,
where determining that at least the second authentication step from the sequence of authentication steps to be executed is based on at least on the authentication of the user at the first authentication step;
execute the second authentication step,
where the second authentication step includes:
receiving an image of the user,
the image of the user captured at a time of execution of the second authentication step;
determining that the received image is captured at the time of execution of the second authentication step; and
providing a result of the second authentication step based at least on the determining that the received image is captured at the time of execution of the second authentication step;
execute a third authentication step when the user is not authenticated at the second authentication step, wherein executing the third authentication step includes
receiving data regarding a passport of the user to be authenticated, and
verifying the data regarding the user's passport from one or more third-party databases; and
allow the user to access the transaction processing system upon successful execution of the third authentication step.

2. The adaptive user authentication system of claim 1, where to allow the user to access the transaction processing system, the one or more processors execute further machine-readable instructions stored in the at least one storage device to:
provide an authenticated user identifier to the transaction processing system.

3. The adaptive user authentication system of claim 1, where to receive the first piece of data the one or more processors execute further machine-readable instructions stored in the at least one storage device to:
receive a phone number as the first piece of data from a user device requesting access to the transaction processing system.

4. The adaptive user authentication system of claim 3, where to determine that the second authentication step is to be executed for authenticating the user the one or more processors execute further machine-readable instructions stored in the at least one storage device to:
identify a failure to verify the phone number provided by the user.

5. The adaptive user authentication system of claim 1, where to provide the result of the second authentication step the one or more processors execute further machine-readable instructions stored in the at least one storage device to:
compare the received image with a known image of an authenticated user retrieved from the user authentication data.

6. The adaptive user authentication system of claim 1, where to determine that the received image is captured at the time of execution of the second authentication step the one or more processors execute further machine-readable instructions stored in the at least one storage device to:
determine a time of image capture; and
determine if the time of image capture coincides with the time of the execution of the second authentication step as obtained from temporal data of a user device.

7. The adaptive user authentication system of claim 6, where to determine the time of image capture, the one or more processors execute further machine-readable instructions stored in the at least one storage device to:
extract metadata associated with the image, and
if the metadata of the image cannot be extracted,
request permission to access a camera of a user device requesting access to the transaction processing system, and
capture the image and record the time of image capture.

8. The adaptive user authentication system of claim 5, where the image is a still image.

9. The adaptive user authentication system of claim 5, where the image is a live video.

10. The adaptive user authentication system of claim 1, wherein to verify the data regarding the passport, the one or more processors execute further machine-readable instructions stored in the at least one storage device to:
verify data stored in a chip included in the passport from the one or more third-party databases.

11. The adaptive user authentication system of claim 1, wherein to execute the third authentication step, the one or more processors execute further machine-readable instructions stored in the at least one storage device to:
allow the user to access the transaction processing system if the data regarding the passport matches data from the one or more third-party databases,
else,
transmit a message to a user device for the user to appear in person at a designated physical location to complete the user authentication process before accessing the transaction processing system.

12. The adaptive user authentication system of claim 1, wherein the one or more processors execute machine-readable instructions stored in the at least one storage device to:
put forth a user interface (UI) that executes the adaptive user authentication process, wherein the UI maintains a look and feel of the transaction processing system.

13. A method of adaptive user authentication, comprising:
receiving a request from a user via a user device to access a transaction processing system;
calculating a risk score associated with the request;
triggering an adaptive authentication process for authenticating the user based on the risk score,
where execution of the adaptive authentication process comprises requesting a plurality of user data pieces over a sequence of information collection steps that include at least a first authentication step;
executing the first authentication step;
determining a result of the first authentication step;
determining that a next authentication step of the adaptive authentication process is to be executed based on the result of the first authentication step;
executing a second authentication step as the next authentication step that includes,
instructing the user to provide an image of the user captured at a time of the execution of the second authentication step;
comparing the captured image with a known image of an authenticated user;
providing a result of the second authentication step based at least on the comparison of the captured image with the known image;
executing a third authentication step if the user is not authenticated at the second authentication step, wherein executing the third authentication step includes,
receiving data regarding a passport of the user to be authenticated, and
verifying the data regarding the user's passport with one or more third-party databases; and
allowing the user to access the transaction processing system upon successful authentication of the user at one of the second authentication step and the third authentication step.

14. The method of claim 13, wherein triggering an adaptive authentication process includes:
comparing the risk score with a predetermined threshold indicative of an authentic user.

15. The method of claim 13, wherein determining the result of the first authentication step includes:
requesting a first piece of data from the user where the first piece of data corresponds to a stored predetermined value; and
clearing the user of the first authentication step if the first piece of data received from the user is same as the stored predetermined value, and
generating a result that the user has failed the first authentication step if the first piece of data received from the user is not the same as the stored predetermined value.

16. The method of claim 15, wherein the first piece of data includes one of a telephone number associated with a user account on the transaction processing system or a personal identification number (PIN).

17. The method of claim 13, where determining that the next authentication step is to be executed based on the result of the first authentication step further comprises:

determining that the user has failed to clear the first authentication step.

18. The method of claim 13, further comprising:
allowing the user to access the transaction processing system if the user is authenticated in the third authentication step, else
generating an alert to the transaction processing system that the user is not authenticated.

19. A non-transitory processor-readable storage medium comprising machine-readable instructions that cause a processor to:
receive a user authentication signal for initiating an adaptive user authentication process that enables a user to access a transaction processing system upon authentication,
where the user authentication signal includes an input that triggers a first authentication step from a sequence of authentication steps to be executed during the adaptive user authentication process;
execute the first authentication step;
determine that at least a second authentication step from the sequence of authentication steps is to be executed for authenticating the user,
where the determination for execution of the second authentication step is based on at least on the authentication of the user at the first authentication step;
execute the second authentication step,
where the second authentication step includes:
receiving an image of the user captured at a time of execution of the second authentication step;
comparing the received image with a known image of an authenticated user retrieved from user authentication data; and
providing a result of the second authentication step based at least on the comparison of the received image with the known image;
execute a third authentication step if the user is not authenticated at the second authentication step, wherein executing the third authentication step includes,
receiving data regarding a passport of the user to be authenticated, and
verifying the data regarding the user's passport with one or more third-party databases; and
allow the user to access the transaction processing system upon successful authentication of the user at each executed authentication step.

20. The non-transitory processor-readable storage medium of claim 19, further comprising instructions that cause the processor to:
determine that the received image is captured at the time of execution of the second authentication step.

* * * * *